(12) United States Patent
Li

(10) Patent No.: US 11,695,707 B1
(45) Date of Patent: Jul. 4, 2023

(54) NETWORK SWITCH

(71) Applicant: ALPHA NETWORKS INC., Hsinchu (TW)

(72) Inventor: Jian Li, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 0 days.

(21) Appl. No.: 17/741,897

(22) Filed: May 11, 2022

(30) Foreign Application Priority Data

Jan. 21, 2022 (TW) .................................. 111102544

(51) Int. Cl.
*H04L 49/40* (2022.01)
*H04L 49/111* (2022.01)

(52) U.S. Cl.
CPC .......... *H04L 49/405* (2013.01); *H04L 49/111* (2022.05)

(58) Field of Classification Search
CPC .............................. H04L 49/405; H04L 49/111
See application file for complete search history.

(56) References Cited

U.S. PATENT DOCUMENTS

| | | | | |
|---|---|---|---|---|
| 2017/0135166 A1* | 5/2017 | Huang | ................... | H01H 13/06 |
| 2022/0059022 A1* | 2/2022 | Wei | ........................... | G09G 3/32 |
| 2023/0010380 A1* | 1/2023 | Kang | ................... | G05B 19/052 |

* cited by examiner

*Primary Examiner* — Luat Phung
(74) *Attorney, Agent, or Firm* — Birch, Stewart, Kolasch & Birch, LLP

(57) ABSTRACT

A network switch displays a state signal of network connection ports by a combination of LEDs and includes a signal management unit, a control unit, switch members, and the LEDs. The signal management unit receives the state signal from the network connection ports and transmits data to the control unit to control each of the switch members and correspondingly output to control each of the LEDs. The state signal includes that a first state data outputs an active/inactive state via a first control signal, a second state data and a third state data output a link-down/up state and a connection speed state via a second control signal, so that the LEDs displays different states of the network connection ports based on a combination of each of the first control signal and each of the second control signal.

9 Claims, 8 Drawing Sheets

NETWORK SWITCH

BACKGROUND OF THE INVENTION

Technical Field

The present invention relates generally to structures of a network switch, and more particularly to a network switch, which could display a state of a network connection port by using LEDs.

Description of Related Art

Typically, a conventional network switch has a plurality of network connection ports, a Port Physical Layer chip (PHY chip), and a plurality of LEDs, wherein the network connection ports are configured to be connected by network lines. The PHY chip is connected to the network connection ports to obtain the state of each network connection port, and correspondingly controls one of the LEDs according to the state of each network connection port. However, only partial states can be displayed due to the functional limitations of the PHY chip. For example, the PHY chip has only one control pin corresponding to each network connection port for controlling one of the LEDs, wherein the LED is constantly on to indicate a Link-up state and is flicker to indicate an active state, but there is no third way for the LED to display another state (e.g. a connection speed).

In all aspects, the conventional network switch still has room for improvement.

BRIEF SUMMARY OF THE INVENTION

In view of the above, the primary objective of the present invention is to provide a network switch, which could display a state of a network connection port with multiple LED combinations.

The present invention provides a network switch including a plurality of network connection ports, a plurality of display modules, a plurality of control circuit modules, a signal management unit, and a control unit, wherein each of the network connection ports is adapted to be connected to a network cable. Each of the display modules includes a plurality of LEDs, and each of the LEDs has a first electrode and a second electrode. Each of the control circuit modules includes a plurality of switch members. Each of the switch members has a first end, a second end, and a control end. The control end is controllable to make the first end and the second end conduct or cut off. The first end of each of the switch members is electrically connected to the second electrode of one of the LEDs, and the second end of each of the switch members is electrically connected to an end of a power source. The signal management unit is electrically connected to the network connection ports and receives a state signal from each of the network connection ports, wherein the state signal includes a first state data, a second state data, and at least one third state data. The signal management unit has a plurality of control pins and a first connecting port, wherein each of the control pins is electrically connected to the first electrode of the LEDs of one of the display modules. The signal management unit correspondingly outputs a first control signal via one of the control pins based on the first state data of each of the state signals that is received. The signal management unit outputs the second state data and the third state data of each of the state signals, which is received, through the first connecting port. The control unit has a second connecting port and a control port, wherein the second connecting port is electrically connected to the first connecting port of the signal management unit. The control port has a plurality of pin assemblies, wherein each of the pin assemblies has a plurality of pins respectively and is electrically connected to the control end of the switch members of one of the control circuit modules. The control unit receives each of the second state data and each of the third state data through the second connecting port, and correspondingly outputs a second control signal to the switch members of one of the control circuit modules via each of the pin assemblies of the control port based on each of the second state data and each of the third state data, thereby changing a displaying way of the LEDs of each of the display modules based on a combination of each of the first control signals and each of the second control signals.

With the aforementioned design, the signal management unit and the control unit could jointly control the display of each LED, thereby achieving the purpose that one of the control pins is connected to multiple LEDs to display the various states of the network connection ports.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
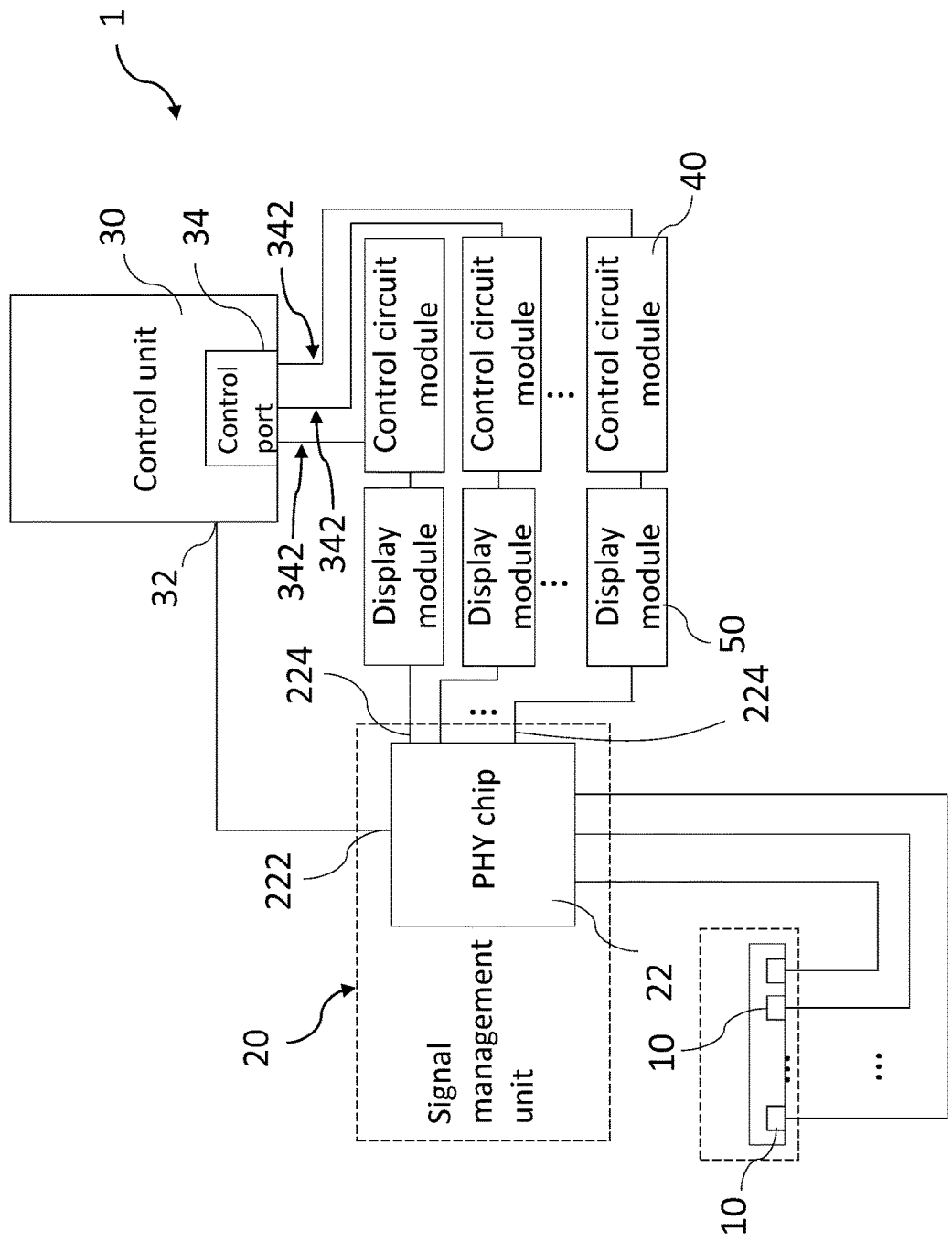
FIG. 1 is a block diagram of the network switch according to a first embodiment of the present invention.
Figure 2:
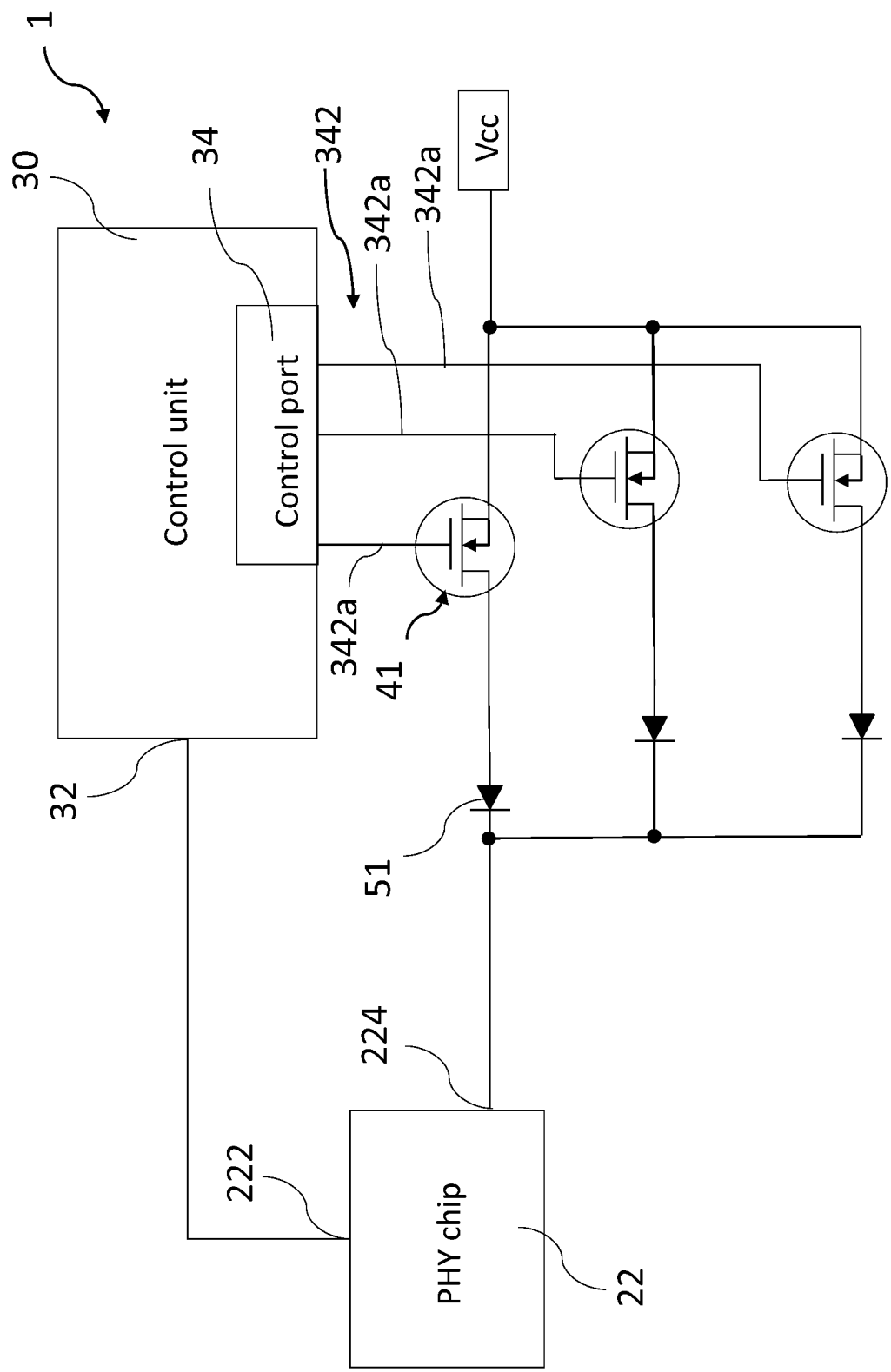
FIG. 2 is a block diagram, showing the partial circuit of the network switch according to the first embodiment of the present invention.

A network switch 1 according to a first embodiment of the present invention is illustrated in FIG. 1 and FIG. 2, including a plurality of network connection ports 10, a plurality of display modules 50, a plurality of control circuit modules 40, a signal management unit 20, and a control unit 30.

Each of the network connection ports 10 is adapted to be engaged with a network cable (not shown) and is connected to an apparatus (not shown) via the network cable, thereby receiving a state signal from the apparatus, wherein each of the network connection ports 10 could be, for example, an ethernet port or an optic fiber network port. The state signal includes a first state data, a second state data, and at least one third state data. In the current embodiment, the first state data indicates an active state or an inactive state; the second state data indicates a link-up state or a link-down state; the third state data indicates one of a plurality of connection speeds, wherein the connection speeds include a first connection speed, a second connection speed, and a third connection speed. In an embodiment, the third state data could also indicate a transmission state or a receiving state. However, the third state data are not limited to the example given above, but could be used to represent other states.

Each of the display modules 50 corresponds to one of the network connection ports 10 for displaying a state of the corresponding network connection port 10, wherein each of the display modules 50 includes a plurality of LEDs 51. Each of the LEDs 51 has a first electrode and a second electrode. In the current embodiment, each of the display modules 50 includes three LEDs 51. However, the number of the LEDs is not a limitation of the present invention, but could be two or more than four in other embodiments. The LEDs 51 have different colors. In the current embodiment, the first electrode of each of the LEDs 51 is a cathode, and the second electrode of each of the LEDs 51 is an anode.

Each of the control circuit modules 40 corresponds to one of the display modules 50 and one of the network connection ports 10 for controlling the LEDs 51 of the corresponding display module 50. Each of the control circuit modules 40 includes a plurality of switch members 41, wherein each of the switch members 41 has a first end, a second end, and a control end. The control end is controllable to make the first end and the second end cut off or conduct. The first end is electrically connected to the second electrode of each of the LEDs 51. The second end is connected to an end of a power source. In the current embodiment, each of the control circuit modules 40 includes three switch members 41 which are MOSFETs as an example, wherein the first end is a drain, the second end is a source, and the control end is a gate. However, the number of the switch members is not a limitation of the present invention, but could be two or more than four in other embodiments. The second end is connected to a positive end Vcc of the power source. A current-limiting resistor (not shown) could be optionally connected in series on each circuit path from a control pin of the switch members 41 to the positive end Vcc of the power source.

In the current embodiment, the signal management unit 20 has a physical layer chip (PHY chip) electrically connected to the network connection ports 10 for receiving the state signals from the network connection ports 10, wherein the PHY chip 22 has a first connecting port 222 and a plurality of control pin 224. The first connecting port 222 is electrically connected to the control unit 30 via a serial management interface (SMI bus) and communicates with the control unit 30. Each of the control pin 224 is electrically connected to the first electrode of the LEDs 51 of one of the display modules 50.

When the PHY chip 222 receives the state signals from each of the network connection ports 10, the PHY chip 222 correspondingly outputs a first control signal via the corresponding control pin 224 based on the received first state data, and outputs the second state data and the third state data that are received to the control unit 30 via the first connecting port 222. The first control signal outputted by each of the control pin 224 includes either a first mode signal or a second mode signal, wherein the first mode signal is either high potential or low potential. In the current embodiment, the first mode signal is in low potential since the control pins are connected to the cathode of the LEDs 51; the second mode signal continuously switches between high potential and low potential.

The control unit 30 could be, for example, a central processing unit, which has a second connecting port 32 and a control port 34, wherein the control port 34 could be, for example, a general-purpose input/output (GPIO). In practice, the control unit 30 could be formed by a central processing unit and a GPIO expansion chip. The second connecting port 32 is electrically connected to the first connecting port 222 of the signal management unit 20 to receive the second state data and the third state data corresponding to each of the network connection ports 10. The control port 34 has a plurality of pin assemblies 342, wherein each of the pin assemblies 342 has a plurality of pin 342a and is connected to one of the control circuit modules 40. In the current embodiment, each of the pin assemblies 342 has three pin 342a. However, the number of the pins is not a limitation of the present invention, but could be two or more than four in other embodiments. Each of the pin 342a is electrically connected to the control end of the switch members 41 of one of the control circuit modules 40. In other words, each of the pin 342a of the control port 34 could individually control one of the switch members 41 to cut off or conduct. The control unit 30 outputs a second control signal via one of the pin assemblies 342 corresponding to the control port 34 based on the second state data and the third state data that are received. The second control signal outputted by each of the pin assemblies 342 includes either a third mode signal or a fourth mode signal, wherein the third mode signal is that at least one of the pin 342a of the pin assembly 342 is in the low potential to make at least one of the switch members 41 receiving the low potential cut off; the fourth mode signal is that at least one of the pin 342a of the pin assembly 342 is in the high potential to make at least one of the switch members 41 receiving the high potential to conduct.

Figure 3:
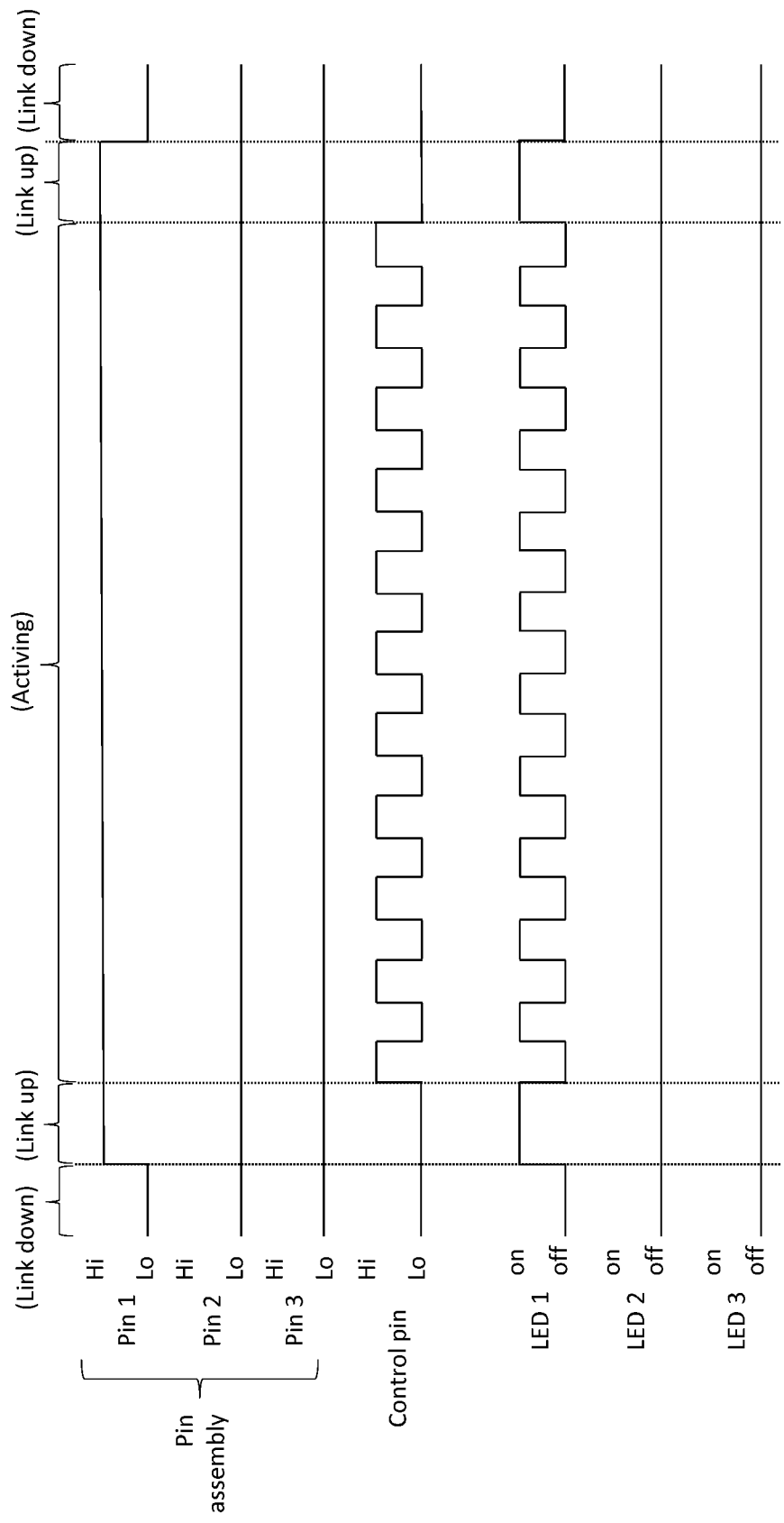
FIG. 3 is a timing diagram of the network switch according to the first embodiment of the present invention.

Referring to FIG. 3, a control method of the LEDs 51 corresponding to one of the network connection ports 10 is used or illustrating, wherein the three LEDs 51 are represented by LED1-LED3 in FIG. 3, and the three pin 342a of the pin assemblies 342 are represented by pin 1-pin 3 in FIG. 3. When the network connection port 10 is disconnected (i.e., the network cable has not connected to the apparatus yet), the first control signal outputted by the signal management unit 20 is the first mode signal (i.e., the control pin 224 is low potential (Lo), and the signal management unit 20 outputs the second state data that is the link-down state to the control unit 30, wherein when the control unit 30 determines that the second state data is the link-down state, the control unit 30 outputs the second control signal as the third mode signal via the corresponding pin assembly 342 (i.e., the pin 1 to the pin 3 are low potential (Lo)) to make the corresponding switch members 41 cut off (i.e., the LED 1 to the LED 3 are off), thereby displaying that the network connection port 10 is disconnected. In practice, when the network connection port 10 is disconnected, the signal management unit 20 could make the control pin 224 be a high impedance state, and may not output the second state data to the control unit 30, and the control unit 30 make the pin 342a of the pin assemblies 342 be the high impedance state, thereby making the corresponding switch members 41 cut off.

When the network connection port 10 is in a state of connected, inactive, and the connection speed is a first connection speed, the state signal received by the signal management unit 20 is that the first state data indicates the inactive state, and the second state data indicates the link-up state, and the third state data indicates that the connection speed is the first connection speed. When the signal management unit 20 determines that the first state data is the inactive state, the first control signal outputted by the control pin 224 is the first mode signal (i.e., the control pin 224 is low potential (Lo), and the signal management unit 20 outputs the second state data and the third state data to the control unit 30, wherein when the control unit 30 determines that the second state data is the link-up state and the third state data is the first connection speed, the second control signal outputted by the pin assemblies 342 of the control unit 30 is the fourth mode signal, thereby making at least one of the corresponding switch members 41 conduct. In the current embodiment, the LED 1 is on to represent the first connection speed; the LED 2 is on to represent the second connection speed; the LED 3 is on to represent the third connection speed, and therefore the fourth mode signal is that the pin 1 is high potential (Hi) to make the corresponding switch member 41 conduct, and the pin 2 and the pin 3 are low potential (Lo) to make the corresponding switch member 41 cut off, thereby the LED 1 is on, and the LED 2 and the LED 3 are off to display that the network connection port 10 is in a state of connected, inactive, and the connection speed is a first connection speed.

When the network connection port 10 is in a state of connected, active, and the connection speed is the first connection speed, the state signal received by the signal management unit 20 is that the first state data indicates the active state, and the second state data indicates the link-up state, and the third state data indicates that the connection speed is the first connection speed. When the signal management unit 20 determines that the first state data is the active state, the first control signal outputted by the control pin 224 is the second mode signal (i.e., the control pin 224 continuously switches between high potential (Hi) and low potential (Lo)), and the signal management unit 20 outputs the second state data and the third state data to the control unit 30, wherein when the control unit 30 determines that the second state data is the link-up state and the third state data is the first connection speed, the second control signal outputted by the pin assemblies 342 of the control unit 30 is the fourth mode signal, thereby making at least one of the corresponding switch members 41 conduct. In the current embodiment, the fourth mode signal is that the pin 1 is high potential (Hi) to make the corresponding switch member 41 conduct, and the pin 2 and the pin 3 are low potential (Lo) to make the corresponding switch member 41 cut off, thereby the LED 1 flicker, and the LED 2 and the LED 3 are off to display that the network connection port 10 is in a state of connected, active, and the connection speed is a first connection speed.

Various state data of one of the network connection ports 10 and the first control signal of the control pin 224, the second control signal of the pin assemblies 342, and various display states of the LEDs 51 of the current embodiment are listed in Table 1.

TABLE 1

| First state data | second state data | third state data | control pins | pin 1 | pin 2 | pin 3 | LED 1 | LED 2 | LED 3 |
|---|---|---|---|---|---|---|---|---|---|
| No | Link-down state | No | Lo | Lo | Lo | Lo | OFF | OFF | OFF |
| Inactive state | Link-up state | First connection speed | Lo | Hi | Lo | Lo | ON | OFF | OFF |
| Inactive state | Link-up state | Second connection speed | Lo | Lo | Hi | Lo | OFF | ON | OFF |
| Inactive state | Link-up state | Third connection speed | Lo | Lo | Lo | Hi | OFF | OFF | ON |
| Active state | Link-up state | First connection speed | Hi/Lo | Hi | Lo | Lo | Flicker | OFF | OFF |
| Active state | Link-up state | Second connection speed | Hi/Lo | Lo | Hi | Lo | OFF | Flicker | OFF |
| Active state | Link-up state | Third connection speed | Hi/Lo | Lo | Lo | Hi | OFF | OFF | Flicker |

(Lo: low potential; Hi: high potential; Hi/Lo: continuously switches between low potential and high potential; on: ignite; off: extinguish)

In this way, a displaying way of the LEDs 51 of the display modules 50 could be changed by a combination of the first control signal and the second control signal corresponding to the network connection ports 10.

Additionally, the control unit 30 could work in conjunction with the third state data to output low potential through at least two of the pin 342a of the pin assemblies 342 at the same time, thereby forming the third mode signal to make at least two of the switch members 41 cut off at the same time, or to output high potential through at least two of the pin 342a of the pin assemblies 342 at the same time, thereby forming the fourth mode signal to make at least two of the switch members 41 conduct at the same time. For instance, referring to Table 2, when the control unit 30 determines that the second state data is the link-up state and the third state data is a fourth connection speed, the control unit 30 outputs high potential through the pin 1 and the pin 2 of the pin assemblies 342, thereby the LED 1 and the LED 2 could be on or flicker at the same time, wherein two light colors emitted by the LED 1 and the LED 2 are mixed to form another light color to represent the connection speed of the network connection port 10 is the fourth connection speed.

TABLE 2

| First state data | Second state data | Third state data | control pins | pin 1 | pin 2 | pin 3 | LED 1 | LED 2 | LED 3 |
|---|---|---|---|---|---|---|---|---|---|
| Inactive state | Link-up state | Fourth connection speed | Lo | Hi | Hi | Lo | on | on | off |
| Active state | Link-up state | Fourth connection speed | Lo | Hi | Hi | Lo | Flicker | Flicker | off |

(Lo: low potential; Hi: high potential; Hi/Lo: continuously switches between low potential and high potential; on: ignite; off: extinguish)

In a second embodiment of the present invention, the state signal of the network connection ports 10 further includes a fourth state data which is either a transmission state or a receiving state, wherein the signal management unit 20 transmits the fourth state data to the control unit 30, and the control unit 30 outputs the second control signal based on the second state data to the fourth state data. For instance, various state data of one of the network connection ports 10 and the first control signal of the control pin 224, the second control signal of the pin assemblies 342, and various display states of the LEDs 51 of the current embodiment are listed in Table 3, wherein at least one of the LED 51 (e.g. the LED 3) is ON to represent the transmission state, and is OFF to represent the receiving state; a combination of the LED 1 and the LED 2 represents the first to third connection speeds.

In this way, the displaying way of the LEDs 51 of the display modules 50 could be changed by the combination of the first control signal and the second control signal corresponding to the network connection ports 10 as well.

Figure 4:
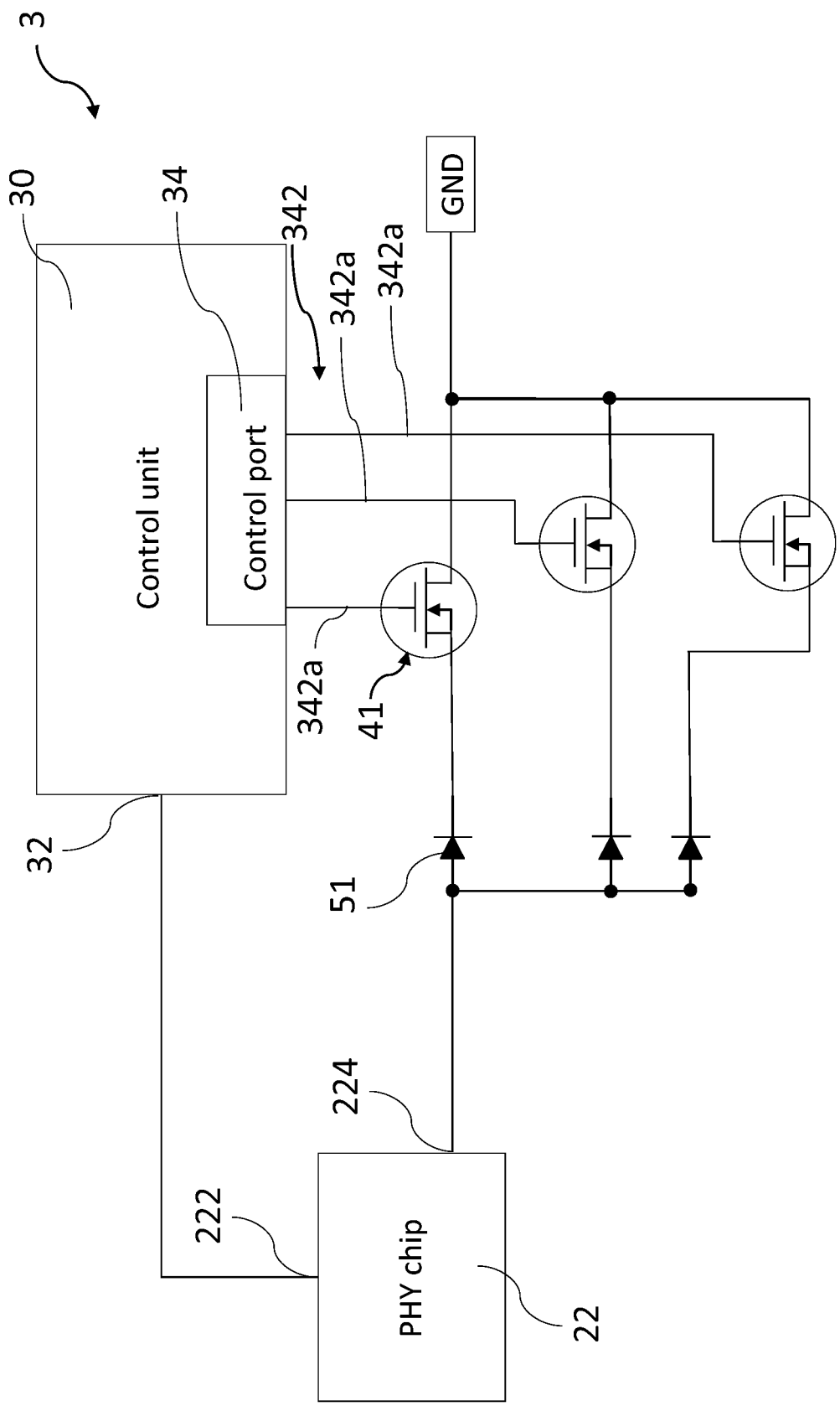
FIG. 4 is a block diagram, showing the partial circuit of the network switch according to a third embodiment of the present invention.

A network switch 3 according to a third embodiment of the present invention is illustrated in FIG. 4, which has almost the same structures as that of the first embodiment, except that the first electrode of each of the LEDs 51 is an anode, and the second electrode of each of the LEDs 51 is a cathode; the first end of each of the switch members 41 is the source and the second end is the drain; the second end of each of the switch members 41 connected to the power source is a ground terminal GND. When the first state data is the inactive state, the first mode signal of the first control signal of the control pin 224 is high potential.

Various state data of one of the network connection ports 10 and the first control signal of the control pin 224, the

TABLE 3

| First state data | Second state data | Third state data | Fourth state data | Control pins | pin 1 | pin 2 | pin 3 | LED 1 | LED 2 | LED 3 |
|---|---|---|---|---|---|---|---|---|---|---|
| Inactive state | Link-up state | First connection speed | Transmission state | Lo | Hi | Lo | Hi | ON | OFF | ON |
| Inactive state | Link-up state | Second connection speed | Transmission state | Lo | Lo | Hi | Hi | OFF | ON | ON |
| Inactive state | Link-up state | Third connection speed | Transmission state | Lo | Hi | Hi | Hi | ON | ON | ON |
| Active state | Link-up state | First connection speed | Transmission state | Hi/Lo | Hi | Lo | Hi | Flicker | OFF | Flicker |
| Active state | Link-up state | Second connection speed | Transmission state | Hi/Lo | Lo | Hi | Hi | OFF | Flicker | Flicker |
| Active state | Link-up state | Third connection speed | Transmission state | Hi/Lo | Hi | Hi | Hi | Flicker | Flicker | Flicker |
| Inactive state | Link-up state | First connection speed | Receiving state | Lo | Hi | Lo | Lo | ON | OFF | OFF |
| Inactive state | Link-up state | Second connection speed | Receiving state | Lo | Lo | Hi | Lo | OFF | ON | OFF |
| Inactive state | Link-up state | Third connection speed | Receiving state | Lo | Hi | Hi | Lo | ON | ON | OFF |
| Active state | Link-up state | First connection speed | Receiving state | Hi/Lo | Hi | Lo | Lo | Flicker | OFF | OFF |
| Active state | Link-up state | Second connection speed | Receiving state | Hi/Lo | Lo | Hi | Lo | OFF | Flicker | OFF |
| Active state | Link-up state | Third connection speed | Receiving state | Hi/Lo | Hi | Hi | Lo | Flicker | Flicker | OFF |

(Lo: low potential; Hi: high potential; Hi/Lo: continuously switches between low potential and high potential; on: ignite; off: extinguish)

second control signal of the pin assemblies 342, and various display states of the LEDs 51 of the current embodiment are listed in Table 4.

TABLE 4

| First state data | Second state data | Third state data | Control pins | pin 1 | pin 2 | pin 3 | LED 1 | LED 2 | LED 3 |
|---|---|---|---|---|---|---|---|---|---|
| No | Link-down state | No | Lo | Lo | Lo | Lo | OFF | OFF | OFF |
| Inactive state | Link-up state | First Connection speed | Hi | Hi | Lo | Lo | ON | OFF | OFF |
| Inactive state | Link-up state | Second Connection speed | Hi | Lo | Hi | Lo | OFF | ON | OFF |
| Inactive state | Link-up state | Third Connection speed | Hi | Lo | Lo | Hi | OFF | OFF | ON |
| Active state | Link-up state | First Connection speed | Hi/Lo | Hi | Lo | Lo | Flicker | OFF | OFF |
| Active state | Link-up state | Second Connection speed | Hi/Lo | Lo | Hi | Lo | OFF | Flicker | OFF |
| Active state | Link-up state | Third Connection speed | Hi/Lo | Lo | Lo | Hi | OFF | OFF | Flicker |

(Lo: low potential; Hi: high potential; Hi/Lo: continuously switches between low potential and high potential; on: ignite; off: extinguish)

The circuit structures of the current embodiment could be also applied to that of the second embodiment of the present invention.

Figure 5:
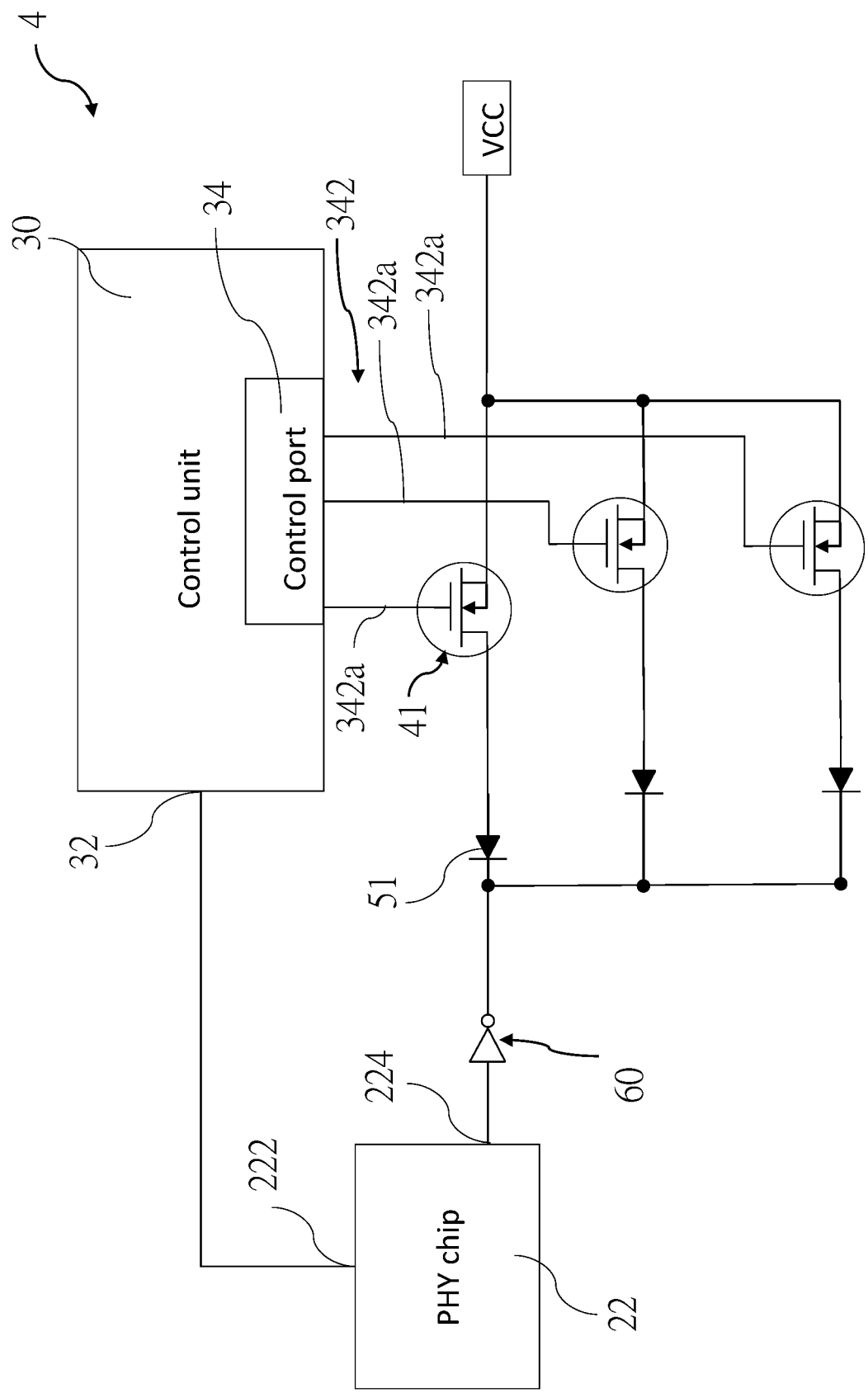
FIG. 5 is a block diagram, showing the partial circuit of the network switch according to a fourth embodiment of the present invention.

A network switch 4 according to a fourth embodiment of the present invention is illustrated in FIG. 5, which has almost the same structures as that of the first embodiment, except that the network switch 4 further includes a plurality of inverters 60, wherein each of the inverters 60 is electrically connected to one of the control pins 224 of the PHY chip 22 of the signal management unit 20 and the first electrode of the LEDs 51 of one of the display modules 50. The inverters 60 are configured to convert the high/low potential to the low/high potential. In the current embodiment, when the first state data is the inactive state, the first mode signal of the first control signal of the control pin 224 is high potential. When the network connection port 10 is disconnected, the control pin 224 could be the high impedance state or high potential.

The circuit structures of the current embodiment could be also applied to that of the second embodiment of the present invention.

Figure 6:
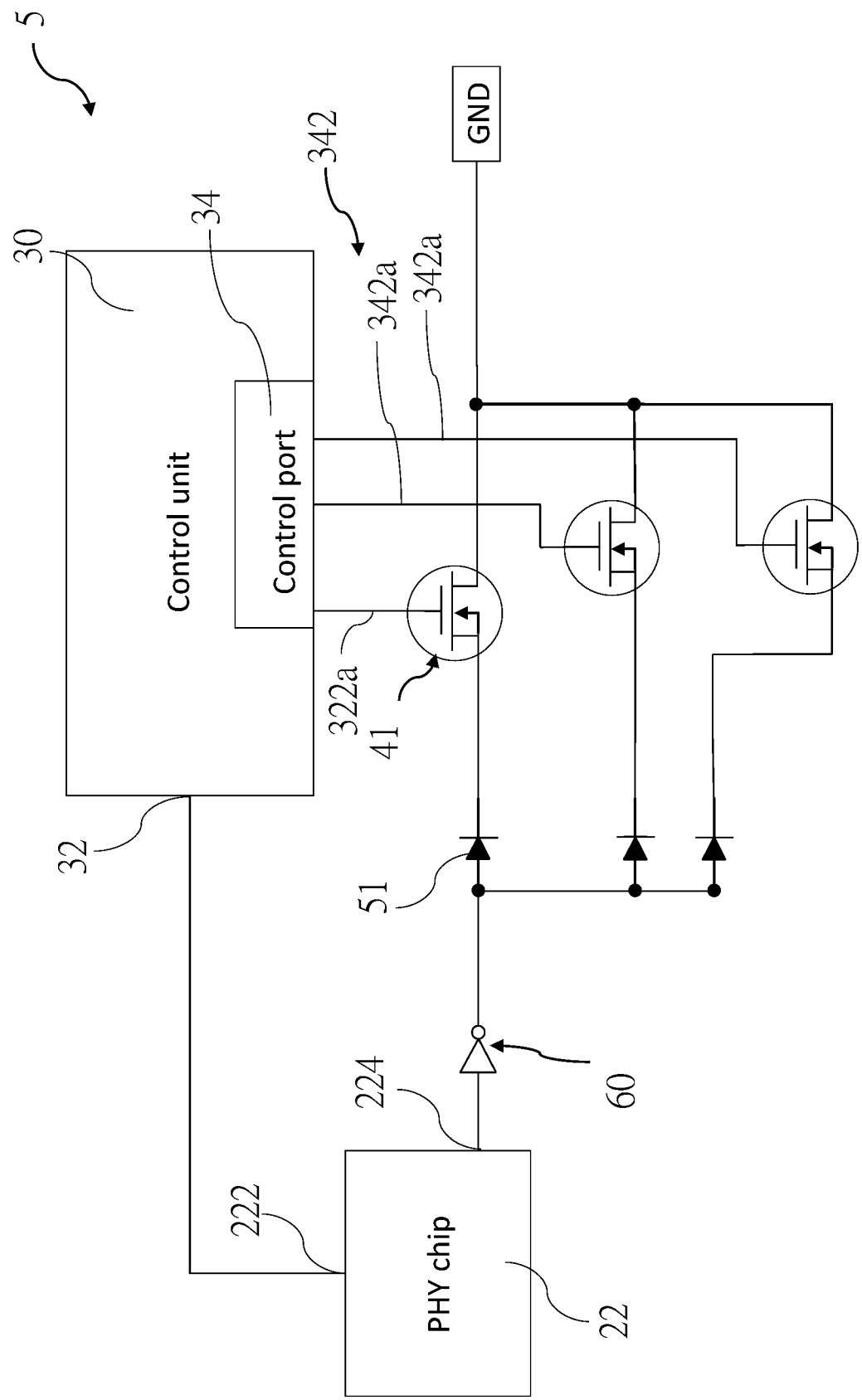
FIG. 6 is a block diagram, showing the partial circuit of the network switch according to a fifth embodiment of the present invention.

A network switch 5 according to a fifth embodiment of the present invention is illustrated in FIG. 6, which has almost the same structures as that of the third embodiment, except that the network switch 5 includes a plurality of inverters 60, wherein each of the inverters 60 is electrically connected to one of the control pins 224 of the signal management unit 20 and the first electrode of the LEDs 51 of one of the display modules 50. When the first state data is the inactive state, the first mode signal of the first control signal of the control pin 224 is low potential. When the network connection port 10 is disconnected, the control pin 224 could be the high impedance state or high potential.

The circuit structures of the current embodiment could be also applied to that of the second embodiment of the present invention.

Figure 7:
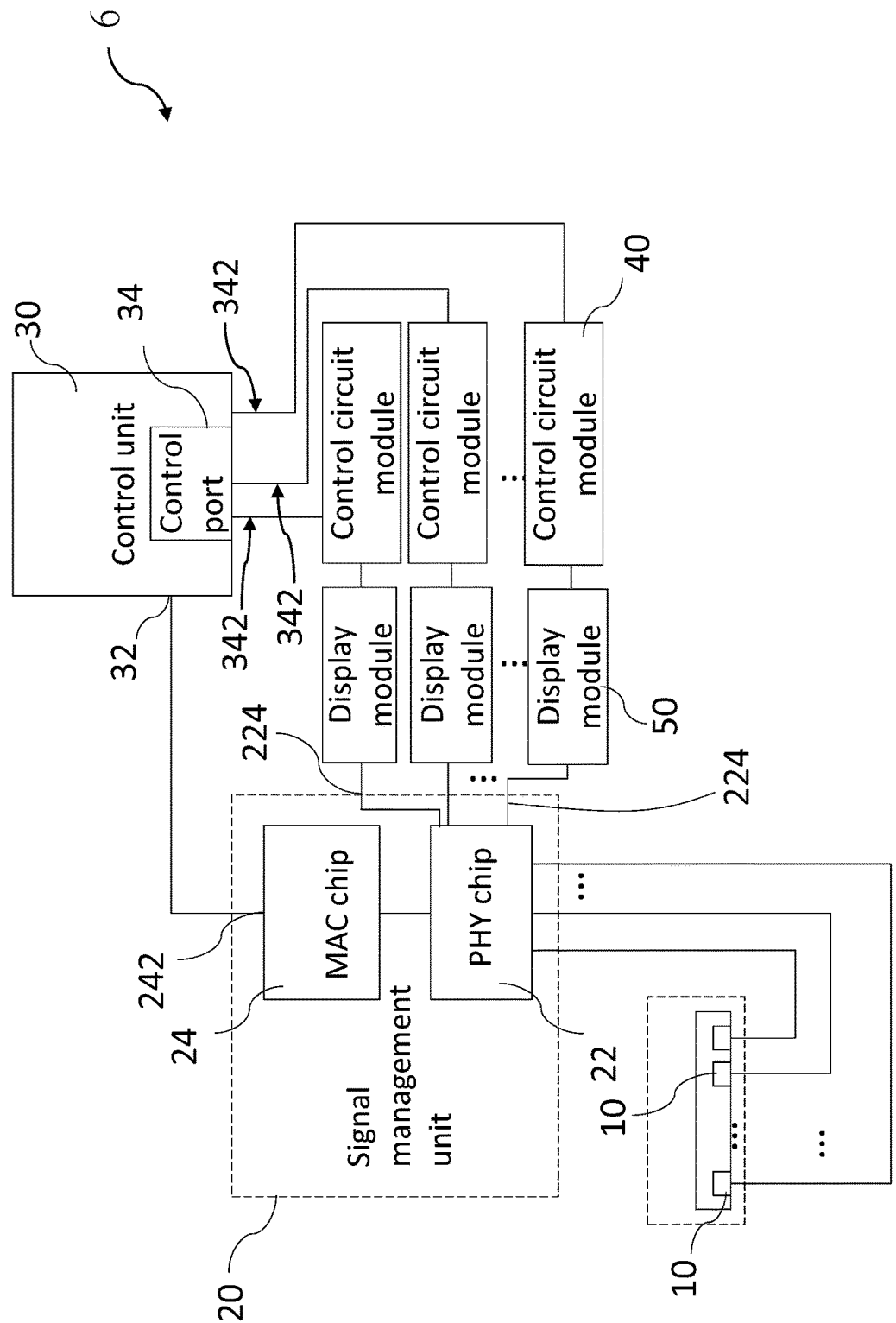
FIG. 7 is a block diagram, showing the partial circuit of the network switch according to a sixth embodiment of the present invention.

A network switch 6 according to a sixth embodiment of the present invention is illustrated in FIG. 7, which has almost the same structures as that of the first embodiment, except that the signal management unit 20 includes the PHY chip 22 and a media access control chip (MAC chip) 24, which are electrically connected, wherein the PHY chip 22 is electrically connected to the network connection ports 10 to receive the state signal, and the PHY chip 22 correspondingly outputs the first control signal via the corresponding control pin 224 based on the received first state data, and transmits the second state data and the third state data to the MAC chip 24. The MAC chip 24 has a first connecting port 242 electrically connected to the control unit 30 and transmits the second state data and the third state data to the control unit 30.

Figure 8:
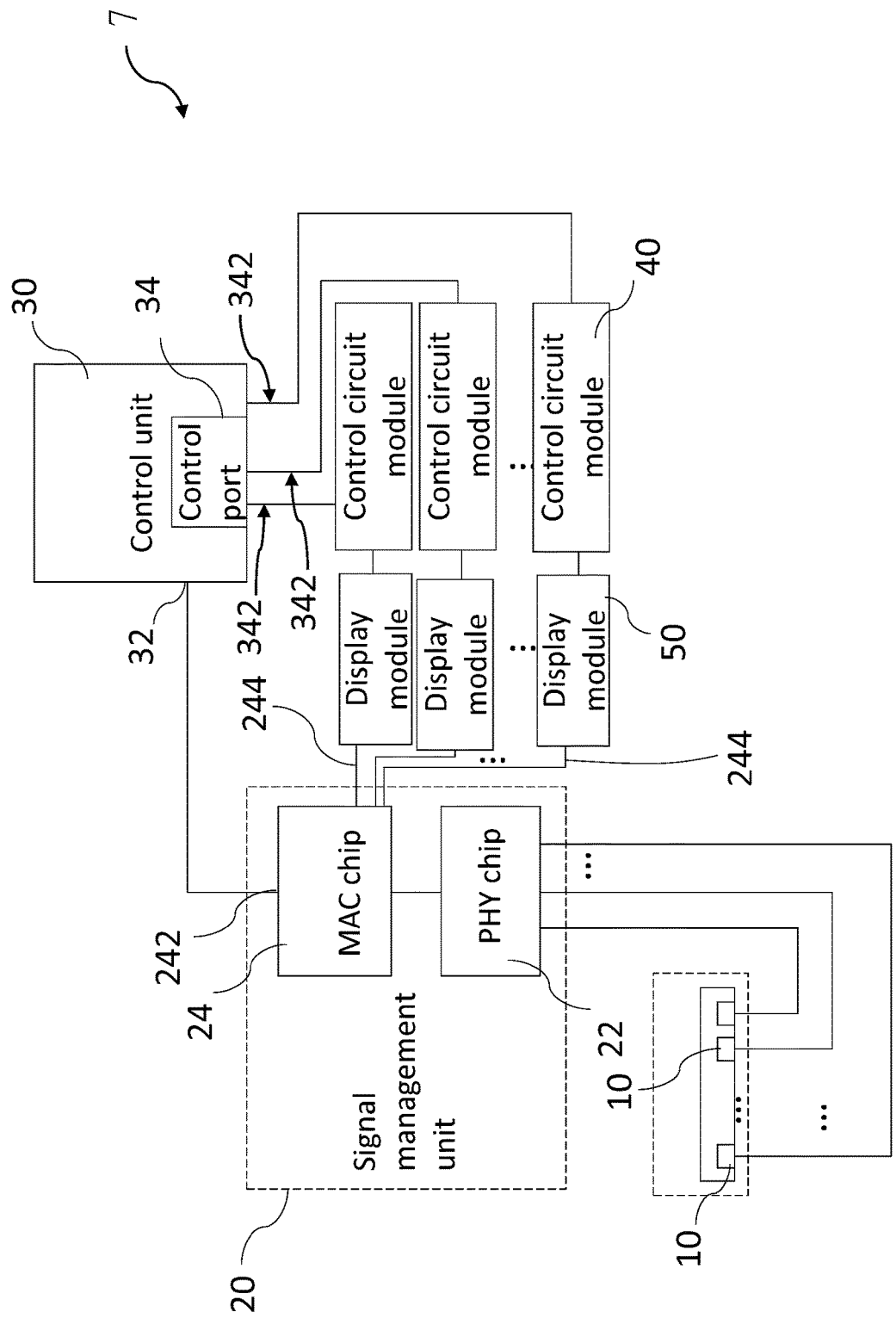
FIG. 8 is a block diagram, showing the partial circuit of the network switch according to a seventh embodiment of the present invention.

A network switch 7 according to a seventh embodiment of the present invention is illustrated in FIG. 8, which has almost the same structures as that of the sixth embodiment, except that the MAC chip 24 has a plurality of control pins 244 electrically connected to the first electrode of the LEDs 51 of one of the display modules 50. The PHY chip 22 transmits the first state data, the second state data, and the third state data to the MAC chip 24, and the MAC chip 24 correspondingly outputs the first control signal through the corresponding control pins 244, and the first connecting port 242 transmits the second state data and the third state data to the control unit 30.

The circuit structures of the sixth and seventh embodiments could be also applied to that of the second to fifth embodiments of the present invention.

With the aforementioned design, the network switch of the present invention could respectively generate the first control signal and the second control signal via the state signal corresponding to each of the network connection ports 10, thereby changing the displaying way of the LEDs 51 of the display modules 50 through the combination of the first control signal and the second control signal, which effectively expand the display of the state of the network connection ports 10 to achieve the purpose that one of the control pins 224 is connected to several LEDs 51 to display the various states of the network connection ports 10.

It must be pointed out that the embodiments described above are only some preferred embodiments of the present invention. All equivalent structures which employ the concepts disclosed in this specification and the appended claims should fall within the scope of the present invention.

What is claimed is:

1. A network switch, comprising a plurality of network connection ports, wherein each of the network connection ports is adapted to be connected to a network cable; the network switch is characterized in that:
the network switch comprises:
a plurality of display modules, wherein each of the display modules comprises a plurality of LEDs, and each of the LEDs has a first electrode and a second electrode;
a plurality of control circuit modules, wherein each of the control circuit modules comprises a plurality of switch members; each of the switch members has a first end, a second end, and a control end; the control end is controllable to make the first end and the second end conduct or cut off; the first end of each of the switch members is electrically connected to the second electrode of one of the LEDs, and the second end of each of the switch members is electrically connected to an end of a power source;
a signal management unit electrically connected to the network connection ports and receiving a state signal from each of the network connection ports, wherein each of the state signals comprises a first state data, a second state data, and at least one third state data; the signal management unit has a plurality of control pins and a first connecting port, wherein each of the control pins is electrically connected to the first electrode of the LEDs of one of the display modules; the signal management unit correspondingly outputs a first control signal via one of the control pins based on the first state data of each of the state signals that is received; the signal management unit outputs the second state data and the third state data of each of the state signals, which is received, through the first connecting port; and
a control unit having a second connecting port and a control port, wherein the second connecting port is electrically connected to the first connecting port of the signal management unit; the control port has a plurality of pin assemblies, wherein each of the pin assemblies has a plurality of pins respectively and electrically connected to the control end of the switch members of one of the control circuit modules; the control unit receives each of the second state data and each of the third state data through the second connecting port, and correspondingly outputs a second control signal to the switch members of one of the control circuit modules via each of the pin assemblies of the control port based on each of the second state data and each of the third state data, thereby changing a displaying way of the LEDs of each of the display modules based on a combination of each of the first control signals and each of the second control signals.

2. The network switch as claimed in claim 1, wherein each of the state signals further comprising a fourth state data; the control unit receives each of the fourth state data via the second connecting port, and correspondingly outputs the second control signal to the switch members of one of the control circuit modules through each of the pin assemblies of the control port based on each of the second state data, each of the third state data, and each of the fourth state data.

3. The network switch as claimed in claim 1, wherein the LEDs of each of the display modules have different colors; each of the second control signals outputted by the control unit is used to correspondingly control the switch members of one of the control circuit modules to conduct or cut off, thereby making at least one of the LEDs of each of the display modules ON or OFF.

4. The network switch as claimed in claim 3, wherein each of the third state data is one of a plurality of connection speeds; the control unit correspondingly controls the switch members of each of the control circuit modules to conduct or cut off based on each of the connection speeds of the third state data, so that the LEDs of each of the display modules display in different ways when the third state data is in different connection speeds.

5. The network switch as claimed in claim 1, wherein each of the first control signals outputted by the control pins of the signal management unit comprises either a first mode signal or a second mode signal; the first mode signal is either a high potential or a low potential; the second mode signal continuously switches between a high potential and a low potential; the second control signal outputted by each of the pin assemblies of the control port of the control unit comprises either a third mode signal or a fourth mode signal; the third mode signal indicates that at least one of a plurality of pins of each of the pin assemblies is in a low potential; the fourth mode signal indicates that at least one of the pins of each of the pin assemblies is in a high potential.

6. The network switch as claimed in claim 5, wherein each of the first state data is either an active state or an inactive state; when the signal management unit determines that each of the first state data is the active state, each of the first control signal that is outputted is the second mode signal; when the signal management unit determines that each of the first state data is the inactive state, each of the first control signal that is outputted is the first mode signal; each of the second state data is either a link-down state or a link-up state; when the control unit determines that each of the second state data is the link-down state, each of the second control signal outputted by each of the pin assemblies of the control unit is the third mode signal, thereby making at least one of the corresponding switch members cut off; when the control unit determines that each of the second state data is the link-up state, each of the second control signal outputted by each of the pin assemblies of the control unit is the fourth mode signal, thereby making at least one of the corresponding switch members conduct.

7. The network switch as claimed in claim 1, further comprising a plurality of inverters, wherein each of the control pins is electrically connected to the first electrode of the LEDs of one of the display modules via one of the inverters; each of the inverters is adapted to convert a high potential in each of the first control signals to a low potential or to convert a low potential in each of the first control signals to a high potential.

8. The network switch as claimed in claim 1, wherein the signal management unit comprises a PHY chip having the control pins and the first connecting port.

9. The network switch as claimed in claim 1, wherein the signal management unit comprises a PHY chip and a MAC chip that are electrically connected; the PHY chip is electrically connected to the network connection ports and receives each of the state signals from each of the network connection ports, and correspondingly outputs the first control signal via one of the corresponding control pins based on the first state data of each of the received state signals, and transmits the second state data and the third state data of each of the state signals to the MAC chip; the MAC chip has the first connecting port, and transmits the second state data and the third state data of each of the received state signals to the control unit.

* * * * *